United States Patent Office 3,215,555
Patented Nov. 2, 1965

3,215,555
METHODS AND MATERIALS FOR METALLIZING CERAMIC OR GLASS BODIES
Roger A. Krey, Summit, N.J., assignor to Radio Corporation of America, a corporation of Delaware
No Drawing. Filed Mar. 29, 1962, Ser. No. 183,675
8 Claims. (Cl. 117—123)

This application is a continuation-in-part of application Serial No. 788,403, filed January 22, 1959, now abandoned.

This invention relates to improved methods and materials for metallizing ceramic or glass bodies. More particularly, one aspect of the invention relates to improved compositions of matter for metallizing these bodies by means of an aqueous solution.

Ceramic and glass materials are widely used in such applications as vacuum tube parts, where materials are required which retain high structural strength at elevated temperatures. Ceramics and glass are also utilized in applications which take advantage of other desirable characteristics, such as a low coefficient of expansion, low thermal conductivity, or, in some instances, relatively high thermal conductivity, low electrical conductivity, and low chemical reactivity. These materials are usually vitreous, but porous varieties are also available. In many such applications it is necessary to provide a method of making hermetic seals or a mechanically strong joint between two ceramic parts, or between a ceramic part and a metal part. Since ceramics generally will not form a strong bond directly to most metals, or to each other, it is necessary to prepare the ceramic article with an adherent metallic coating which can be utilized to bond the ceramic parts to each other or to metal parts by brazing. The process of providing such an adherent coating on a ceramic is known as metallizing.

Ceramic bodies have been metallized by sintering a coating of powdered metals such as molybdenum and tungsten to the surface of the body. However, this method is disadvantageous when applied to irregular contours or to the interior of holes. Close control of both particle size and the depth of the coating is necessary in order to obtain consistent results with this method. The coating is therefore preferably applied by a screening process, which is more expensive than spraying or painting.

Powders of insoluble molybdates or tungstates, or of oxides of molybdenum and tungsten, have been suspended in a binder, but the resulting mixtures did not spread as evenly as required except on flat surfaces. This method has not been satisfactory when applied to irregular contours or the interior of small holes. It has been found difficult to make such suspensions penetrate small holes or depressions in a body and produce a sufficiently thin and uniform deposit therein without clogging the holes. In sum, the prior art methods have been difficult to control.

An object of this invention is to provide an improved and easily controlled process for metallizing the surface of a ceramic or glass body.

Another object of this invention is to provide a simple and inexpensive method of metallizing the surface of a ceramic or glass body.

Another object of this invention is to provide a metallizing material in the form of a uniform solution of controlled composition.

Still another object is to provide an improved method of coating a ceramic or glass surface with a uniform layer of certain metals.

Yet another object is to provide an improved process for metallizing the interior of small holes and recesses in ceramic bodies.

These and other objects of the invention are attained by utilizing a metallizing solution prepared by dissolving a metal oxide selected from the group consisting of an oxide of molybdenum, tungsten, or mixtures of said oxides, in an aqueous solution of a compound having an alkali metal cation and an anion such as a carbonate, bicarbonate, hydroxide, or soluble molybdates and tungstates. The amount of said metal oxide which is dissolved in the aqueous solution is sufficient to form the dimetalate, i.e., the dimolybdate or ditungstate, of said cation.

The metallizing solution thus prepared is clear, usually transparent, and readily applied to the surface of a ceramic or glass article. Next, the ceramic or glass body is dried, leaving a layer of the metallizing material over the surface of the body. If desired, this layer may be more evenly distributed by heating the body to a temperature about 100 to 200° C. above the melting point of the metallizer. The coated ceramic or glass body is then fired in a reducing atmosphere, so that the metallizing compound is reduced to the corresponding metal. Under some circumstances it is advantageous to perform the melting step concurrently with reduction. The temperature and the composition of the atmosphere are selected so as to bond the reduced metal to the ceramic or glass. The adherent metal film thus produced can be utilized in subsequent steps to form a hermetic seal between two ceramic articles, or between a ceramic and a metal article. Alternatively, the metal film may serve as a base on which to deposit other metals which do not adhere to ceramics.

The invention will be better understood from the following detailed description and specific examples.

The first step in the process is the preparation of a metallizing solution including a first component selected from the class consisting of an oxide of molybdenum, tungsten, or mixtures thereof, and a second component consisting of a carbonate, bicarbonate, hydroxide, tungstate, or molybdate of an alkali metal. Such a solution may be prepared in accordance with three different embodiments of the invention.

In the first embodiment, the carbonate or bicarbonate is added to a suitable volume of water. The amount of carbonate added may be in excess of that which will dissolve in the quantity of water used, but this excess will subsequently dissolve during the ensuing reaction. The carbonate is selected from those of the alkali metals. An oxide selected from the group consisting of oxides of molybdenum and tungsten, or a mixture of the oxides of the two metals, is then added to the carbonate and water, in amount sufficient to form the dimolybdate or ditungstate of the alkali metal.

The metallizing solution prepared as described in the above example may be used directly, but can be concentrated, if desired, by evaporating some of the water. The metallizing solution is readily applied over the surface of a ceramic body which, in this example, is forsterite. The solution may be painted on the ceramic with a brush, used as a dipping bath, sprayed or applied by any other convenient method.

The ceramic is then dried, leaving a relatively uniform layer of the solute over the ceramic surface. A convenient and rapid method of drying the ceramic body after the application of the metallizing solution is to heat the body in air at a relatively low temperature, approximately 100° C. In this example, the ceramic body is dried by heating it for 15 minutes at a temperature of 100° C. in air.

The ceramic article is now ready for the furnace, where a high temperature and a reducing atmosphere such as hydrogen or the like convert the coating to the metallic state, and at the same time promote the chemical reactions which bond this metal to the ceramic. The rate at which this ceramic article is brought to temperature is determined by several factors, such as the extent to which melting of the metallizing compound is desired for even spreading; the correct rate of reduction to control melting and runover into areas of the ceramic surface where metallizing is not desired; avoidance of prolonged exposure to temperatures at which reduction but not bonding will occur. For forsterite parts, 5 minutes at 400 to 500° C., plus 1 minute for transition to the firing temperature, has been successful. For alumina ceramic parts, 5 minutes at about 100° C. has produced a very smooth metallic coat. Forsterite parts with small holes demanding extreme uniformity of metallizing are often heated first in air to 700 to 800° C. for 10 minutes to completely melt and evenly distribute the metallizing coat without any concurrent reduction, which would interfere with the even distribution.

The last stage of the process is the full reduction of the metallizing material to the metal with concurrent bonding to the ceramic article, at a temperature about 20 to 200° C. below the vitrifying temperature of the ceramic. A firing temperature of about 1100° C., to about 1575° C. is satisfactory for the forsterite and alumina ceramic compositions which have been employed. The optimum temperature for this step depends principally on the particular ceramic, and also on the metallizing composition and the furnace atmosphere. This step is performed in a reducing atmosphere, such as forming gas, hydrogen, and the like. With forsterite ceramics, a bright metallic surface is produced by firing in dry hydrogen. On certain high alumina ceramics, improved bonding strength of the metal coating is achieved by the addition of water vapor to the reducing atmosphere used, whether hydrogen or forming gas. Since reduction to the metal will take place over a wide temperature range, the particular heating profile utilized depends inter alia on the size and shape of the ceramic bodies. The rapid heating of large or irregularly shaped ceramic parts is undesirable because it may introduce interior stress of sufficient magnitude to crack the ceramic body. It is preferable to use a specific heating profile for this step, rather than to rely on visual observation of the color changes of the ceramic body. Forsterite, of the type used in these examples, is fired in hydrogen for 30 minutes at 1325° C. With high alumina ceramics, as used in the examples, a temperature of about 1525° C. is used.

A metallic adherent surface film of molybdenum is thereby formed over the surface of the ceramic. The film of molybdenum metal adheres to a thin transition layer between itself and the ceramic. The composition of the transition layer is complex, probably consisting, beginning with the ceramic, of a mixture of ceramic and metallizer oxides, metallizer oxide and metal, and finally the layer of metal itself. The entire layer produced according to the above example is quite thin, being only about .0005 inch thick. The layer of elemental molybdenum thus formed is continuous and quite uniformly thick. It may now be utilized to fabricate a hermetic seal between the ceramic body and a metal part, or between two ceramic bodies which have been metallized by this method. If desired, a layer of another metal which cannot be deposited directly, on the ceramic, for example nickel or copper, may be deposited upon the molybdenum layer.

An important feature of this invention is the feasibility of metallizing the interior of small holes, slots, recesses and the like, which was very difficult to accomplish by the prior art methods. For example, the interior of holes about .017 inch in diameter and .100 inch long have been metallized by the above method without obstructing the holes in any way. Furthermore, no subsequent finishing processes were required prior to the copper brazing of metal wires, for example molybdenum wires, inserted in the holes.

The heating profiles may be varied in accordance with various factors, such as the size, shape, and composition of the ceramic body, the particular metallizing solution, and the firing atmosphere. Corresponding amounts of $Na_2CO_3 \cdot H_2O$, $Na_2CO_3 \cdot 7H_2O$, and $Na_2CO_3 \cdot 10H_2O$ may be used instead of anhydrous $Na_2CO_3$, and other alkali metal carbonates can be utilized instead of sodium carbonates. The water added should be adjusted to the quantity of water of hydration which is involved.

In the second embodiment of the invention, the metallizing solution is prepared by dissolving molybdenum trioxide or tungsten trioxide or a mixture of these two oxides in a solution comprising the hydroxide of one of the alkali metals.

*Example I*

A metallizing solution is prepared by dissolving 22.72 grams (0.54 mol) of $LiOH \cdot H_2O$ in 100 ml. of distilled water. Next, 78 grams of molybdenum trioxide (slightly more than 0.54 mol) is dissolved in the lithium hydroxide solution while swirling the flask. The flask is warmed on a hot plate at low heat and swirling is continued until no further dissolution of the trioxide takes place. Only very little molybdenum trioxide should remain undissolved. The solution is then filtered. The filtrate should consist of about 125 cc. of a very clear solution having a slightly greenish hue, with a specific gravity of about 1.55 and a pH of about 6.5 to 7.0. If a more dilute solution is desired, water may be added to reduce the specific gravity of the solution to about 1.40. Alternatively, the solution may be concentrated up to a specific gravity of about 2.0.

The reaction involved may be described as follows.

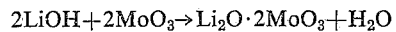
$$2LiOH + 2MoO_3 \rightarrow Li_2O \cdot 2MoO_3 + H_2O$$

The solution of lithium dimolybdate thus prepared may be applied to the ceramic, dried, and fired in a reducing atmosphere as described above. Lithium dimolybdate thus formed is an advantageous metallizing agent for some applications because it has a low melting point (about 530° C.).

The same embodiment will be described utilizing mixed oxides as follows.

*Example II*

A solution of lithium hydroxide is prepared as in Example I above, but instead of dissolving 78 grams $MoO_3$, a mixture of 37 grams of molybdenum trioxide and 59 grams of tungsten trioxide is used. The mixture contains slightly more than ¼ mol $MoO_3$ and ¼ mol $WO_3$. The resulting solution is filtered to remove the small amount of undissolved oxides. The reactions involved may be written as follows.

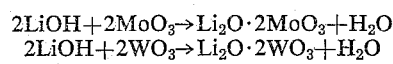
$$2LiOH + 2MoO_3 \rightarrow Li_2O \cdot 2MoO_3 + H_2O$$
$$2LiOH + 2WO_3 \rightarrow Li_2O \cdot 2WO_3 + H_2O$$

When the metallizing solution prepared as above is applied to a ceramic and dried, the film left on the ceramic can be considered a mixture of lithium dimolybdate

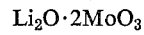
$$Li_2O \cdot 2MoO_3$$

and lithium ditungstate $Li_2O \cdot 2WO_3$. However, the actual composition of the dried film is not precisely known, and may be more complex than a simple mixture.

The rest of the metallizing process, which includes firing the coated ceramic article in a reducing ambient at a temperature of about 1100° C. to about 1575° C. but about 20 to 200° C. below the vitrifying temperature of the ceramic, is similar to that described above.

In the third embodiment of the invention, the metallizing solution is prepared by dissolving molybdenum trioxide or tungsten trioxide or a mixture of these two oxides in a solution of the molybdate or tungstate of one of the alkali metals.

Example III

A solution is prepared by dissolving 182 grams (slightly more than ½ mol) of $K_2WO_4 \cdot 2H_2O$ in 600 ml. distilled water. Next an oxide mixture consisting of 58 grams (¼ mol) tungsten trioxide and 36 grams (¼ mol) of molybdenum trioxide is added to the solution with constant stirring. The solution is then filtered to remove any undissolved oxides. Subsequent steps of concentrating to a specific gravity of 1.4 or above, applying the solution to a ceramic body, drying, and firing in a reducing atmosphere, are similar to those described above.

The exact nature of the film left on the ceramic after the drying step is unknown, but may consist of a complex mixture of compounds such as potassium ditungstate $K_2O \cdot 2WO_3$, and potassium dimolybdate $K_2O \cdot 2MoO_3$.

The solutions described above can also be utilized to metallize glass articles. The metallizing compound can be reduced at lower temperatures, such as 400 to 600° C., provided sufficient heating time is used.

Aqueous solutions of the monomolybdates and monotungstates of the alkali metals have been tried as metallizing agents, but the results obtained have been unsatisfactory in some important respects. The coatings produced were rough and non-uniform, tended to clog the interiors of small holes, and were not readily controllable or reproducible. In contrast, aqueous solutions of the dimolybdates and ditungstates of the alkali metals give smooth and uniform coatings on both ceramic and glass, do not clog the interiors of small holes, and are readily controllable and reproducible. Aqueous solutions of lithium dimolybdate have been found particularly advantageous as metallizing agents, probably because of the low melting point of lithium dimolybdate.

It will be understood that the above examples are by way of illustration only, and not limitation. Many variations may be made in the process without departing from the spirit and scope of the invention. For example, instead of dissolving the molybdenum or tungsten trioxides in a solution of a single alkali metal hydroxide or a single alkali metal carbonate, it is possible to use a solution containing a mixture of carbonates, such as sodium carbonate and lithium carbonate, or a solution containing a mixture of hydroxides, such as lithium hydroxide and potassium hydroxide, or a mixture of sodium carbonate and sodium hydroxide. Mixtures such as sodium carbonate and sodium bicarbonate may also be used. Mixtures of any of these compounds may be used to provide the necessary amount of anions. The heating profiles may be varied in accordance with such factors as the size, shape, and composition of the ceramic body, the particular metallizing solution, and the reducing atmosphere employed. Non-vitreous or porous ceramic and glass bodies may also be metallized in accordance with the invention. In each case, the firing temperature utilized to reduce the metallizing solution should be below the softening temperature of the body.

What is claimed is:

1. A method of metallizing an article selected from the group consisting of glass and ceramic, which comprises coating said article with an aqueous solution prepared by dissolving a metal oxide selected from the group consisting of an oxide of molybdenum, an oxide of tungsten, and mixtures of said oxides, in an aqueous solution of a compound having an alkali metal cation and an anion selected from the group consisting of carbonate, bicarbonate, hydroxide, molybdate, and tungstate, the amount of said dissolved metal oxide being sufficient to form the di-metalate compound of said cation, drying said coated article, and firing said article in a reducing ambient.

2. A method of metallizing a ceramic article which comprises coating said article with an aqueous solution prepared by dissolving a metal oxide selected from the group consisting of an oxide of molybdenum, an oxide of tungsten, and mixtures of said oxides, in an aqueous solution of a compound having an alkali metal cation and an anion selected from the group consisting of carbonate, bicarbonate, hydroxide, molybdate, and tungstate, the amount of said dissolved metal oxide being sufficient to form the di-metalate compound of said cation, drying said coated article, and firing said article in a reducing ambient.

3. A method of metallizing a glass article which comprises coating said article with an aqueous solution prepared by dissolving a metal oxide selected from the group consisting of an oxide of molybdenum, an oxide of tungsten, and mixtures of said oxides, in an aqueous solution of a compound having an alkali metal cation and an anion selected from the group consisting of carbonate, bicarbonate, hydroxide, molybdate, and tungstate, the amount of said dissolved metal oxide being sufficient to form the di-metalate compound of said cation, drying said coated article, and firing said article in a reducing ambient.

4. A method of metallizing a ceramic article which comprises coating said article with an aqueous solution prepared by dissolving a metal oxide selected from the group consisting of molybdenum trioxide, tungsten trioxide, and mixtures of said oxides in an aqueous solution of a compound having an alkali metal cation and an anion selected from the group consisting of carbonate, hydroxide, molybdate, and tungstate, the amount of said dissolved metal trioxide being sufficient to form the di-metalate compound of said cation, drying said coated article, and firing said article in a reducing ambient at a temperature about 20 to 200° C. below the vitrifying temperature of the ceramic.

5. A method of metallizing a ceramic article which comprises coating said article with an aqueous solution prepared by dissolving a metal oxide selected from the group consisting of molybdenum trioxide, tungsten trioxide, and mixtures of said oxides in an aqueous solution of a compound having an alkali metal cation and an anion selected from the group consisting of carbonate, hydroxide, molybdate, and tungstate, the amount of said dissolved metal trioxide being sufficient to form the di-metalate compound of said cation, drying said coated ceramic article, and firing said article in a reducing ambient at a temperature high enough to reduce said metallizing compound to said metal and bond said metal to said ceramic.

6. A method of metallizing a ceramic article which comprises coating said article with an aqueous solution prepared by dissolving a metal oxide selected from the group consisting of molybdenum trioxide, tungsten trioxide, and mixtures of said oxides in an aqueous solution of a compound having an alkali metal cation and an anion selected from the group consisting of carbonate, hydroxide, molybdate, and tungstate, the amount of said dissolved metal trioxide being sufficient to form the di-metalate compound of said cation, drying said coated ceramic article, heating said article to about 100 to 200° C. above the melting point of the metallizing compound, and firing said article in a reducing ambient at a temperature about 20 to 200° C. below the vitrifying temperature of the ceramic.

7. A method of metallizing a ceramic article which comprises coating said article with an aqueous solution of lithium dimolybdate prepared by dissolving molybdenum trioxide in an aqueous solution of lithium hydroxide, the molar amount of molybdenum trioxide dissolved being equal to the molar amount of lithium hydroxide present and sufficient to form $Li_2O \cdot 2MoO_3$, drying said coated ceramic article, and firing said article in a reducing ambient.

8. A method of metallizing a ceramic article which comprises coating said article with an aqueous solution of lithium dimolybdate prepared by dissolving molybdenum trioxide in an aqueous solution of lithium hydroxide, the molar amount of molybdenum trioxide dissolved being equal to the molar amount of lithium hydroxide present and sufficient to form $Li_2O \cdot 2MoO_3$, said solution having a final specific gravity of 1.4 to 2.0, drying said coated ceramic article, heating said article to about 100 to 200° C. above the melting point of the metallizing compound, and firing said coated article in a reducing atmosphere at a temperature about 20 to 200° C. below the vitrifying temperature of said ceramic so as to form an adherent molybdenum-containing layer over the surface of said article.

References Cited by the Examiner

UNITED STATES PATENTS

| | | | |
|---|---|---|---|
| 401,120 | 4/89 | Boltome | 117—119.6 |
| 1,399,722 | 12/21 | Heany | 117—227 |
| 1,884,665 | 10/32 | Greiner | 117—124 |
| 2,667,427 | 1/54 | Nolte | 117—123 |
| 2,776,472 | 1/57 | Mesick | 117—123 |
| 2,780,561 | 2/57 | La Forge | 117—71 |
| 2,857,664 | 10/58 | Leeks | 29—473.1 |
| 2,876,139 | 3/59 | Flowers | 117—160 |
| 2,904,456 | 9/59 | Nolte | 117—212 |
| 2,919,209 | 12/59 | Bossard | 117—123 |
| 3,051,592 | 8/62 | Woerner | 117—227 |

FOREIGN PATENTS

| | | |
|---|---|---|
| 795,846 | 5/58 | Great Britain. |
| 834,303 | 5/60 | Great Britain. |
| 853,984 | 11/60 | Great Britain. |

RICHARD D. NEVIUS, *Primary Examiner.*